United States Patent [19]

Ray et al.

[11] 3,964,919

[45] June 22, 1976

[54] GLASS COMPOSITIONS

[75] Inventors: Neil Hunter Ray; William Derek Robinson; Cyril John Lewis, all of Runcorn, England

[73] Assignee: Imperial Chemical Industries Limited, London, England

[22] Filed: July 29, 1975

[21] Appl. No.: 599,999

Related U.S. Application Data

[63] Continuation of Ser. No. 329,167, Feb. 2, 1973.

[30] Foreign Application Priority Data

Feb. 14, 1972 United Kingdom............... 6694/72

[52] U.S. Cl. .............................. 106/47 R; 106/47 Q
[51] Int. Cl.² ...................... C03C 3/16; C03C 3/12
[58] Field of Search .......................... 106/47 R, 47 Q

[56] References Cited

UNITED STATES PATENTS

| | | | |
|---|---|---|---|
| 2,518,194 | 8/1950 | Silverman ......................... | 106/47 R |
| 2,920,972 | 1/1960 | Godron ............................. | 106/47 R |
| 2,996,390 | 8/1961 | Weissenberg et al............. | 106/47 Q |
| 3,025,204 | 3/1962 | Heintz............................... | 106/47 R |
| 3,179,524 | 4/1965 | Hunter.............................. | 106/47 R |
| 3,253,934 | 5/1966 | Godron.............................. | 106/47 R |
| 3,278,318 | 10/1966 | Hensler et al..................... | 106/47 R |

FOREIGN PATENTS OR APPLICATIONS

| | | | |
|---|---|---|---|
| 761,288 | 11/1956 | United Kingdom............... | 106/47 R |
| 761,289 | 11/1956 | United Kingdom............... | 106/47 R |
| 799,600 | 8/1958 | United Kingdom............... | 106/47 R |

OTHER PUBLICATIONS

Weyl, W. A. – Coloured Glasses (1959) London, pp. 136–137, 216–217.

*Primary Examiner*—Winston A. Douglas
*Assistant Examiner*—Mark Bell
*Attorney, Agent, or Firm*—Cushman, Darby & Cushman

[57] ABSTRACT

Phosphate glasses containing minor amounts of the oxides of chromium, molybdenum and tungsten (Group VIb) have improved water resistance and low softening points. Suitable compositions are within the range (moles percent)

$P_2O_5$ 50–75

Group VIb oxides 0.1–10, comprising singly or in combination $CrO_3$ up to 2.6, $MoO_3$ up to 7, $WO_3$ up to 7

At least one oxide selected from alkali metal oxides and alkaline earths 15–49.9

Addition of oxidizing agents (e.g. sodium nitrate) to the melt may be used to keep the Group VIb metals in the hexavalent state.

18 Claims, No Drawings

GLASS COMPOSITIONS

This is a continuation of application Ser. No. 329,167 filed Feb. 2, 1973.

This invention relates to inorganic oxide glass compositions and to composite products comprising such compositions.

Phosphate glasses having transformation temperatures below approximately 200°C tend to be susceptible to attack by water. We have now found that by imcorporating minor amounts of one or more oxides of metals in Group VIb of the Periodic Table, i.e. chromium, molybdenum and tungsten, the resistance to water of these glasses may be improved without significantly increasing their softening points.

The invention provides inorganic oxide glasses having compositions within the range (in moles percent)

$P_2O_5$ 50–75

Group VIb oxides 0.1–10, comprising singly or in combination $CrO_3$ up to 2.6, $MoO_3$ up to 7, $WO_3$ up to 7

At least one oxide selected from alkali metal oxides and alkaline earths 15–49.9 the total of all the above components being at least 98 moles of the total composition, excluding water. Water is omitted from the proportions set out above, but may be present in amounts up to about 5 percent by weight of the composition. Oxides other than than those listed above may be present up to about 2 moles percent of the composition; examples of such oxides are $B_2O_3$, $SiO_2$ and $Al_2O_3$.

Preferably the total amount of Group VIb oxides present should not exceed 8 moles percent, and more preferably should not exceed 5 moles percent. Where more than one Group VIb oxide is present in the glass compositon the proportion of $MoO_3$ is preferably up to 2.6%. Where one Group VIb oxide is present the preferred proportion of $CrO_3$ is 2.0–2.6%, of $MoO_3$ 2.0–5%, more preferably 2.0–2.6%, and of $WO_3$ 2–5%.

The glasses may be prepared by heating together the appropriate oxides, or their precursors. By 'precursor' is meant a compound which on heating will react with the other components present to give the same chemical composition in the product as if the oxide had been used. Usually this reaction will occur with evolution of one or more volatile compounds, for example water, carbon dioxide and ammonia. Thus suitable precursors of phosphoric oxide include phosphoric acid and ammonium phosphates, while carbonates may be used as precursors of metal oxides. Ammonium molybdate is a suitable precursor of $MoO_3$. Mixtures of an oxide and a precursor of that oxide, or of two or more precursors of the same oxide may be used, and the same compound may be used as a precursor of more than one oxide, thus for example potassium phosphate is a precursor of $K_2O$ and of $P_2O_5$, and sodium tungstate is a precursor of $Na_2O$ and $WO_3$.

The heating may be carried out in a two-stage process, in which some or all of the components are first heated together at a relatively low temperature, for example 300°–500°C, to give a glassy mixture (conveniently referred to as the premelt), which is then refined at a higher temperature, for example 500°–800°C. The duraton of the first stage of the heating process, to form the premelt, is generally from 1 8 hr. When preparing a 2kg batch, a time of 2½ to 4½ hours is convenient. If less than all of the components are present at the initial heating stage the remaining material may be added subsequently before or during the refining stage. This method is convenient for small scale laboratory preparations, but alternatively the components may be mixed together and heated for example to 500°–800°C in a single stage operation. The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

During refining water is gradually lost, the glass network becomes more highly crosslinked, and the viscosity and transformation temperature (Tg) of the glass increase. Small amounts of volatile oxide components, for example $P_2O_5$, may be lost during the refining stage, and it is desirable to keep the temperature below 800°C when refining glasses according to the invention, to minimise any such loss. As mentioned above, the residual water in glasses according to the invention may represent up to 5% by weight of the total, but is not included in the compositions set out above, which may be regarded as nominal molar compositions, in that they are based upon the composition of the initial mixture of components.

A glass of a given composition may have a range of transformation temperatures, depending upon the refining conditions, and a glass having any desired transformation temperature within this range may be obtained by routine experimentation involving selection of the appropriate conditions, for example time, temperature and batch size, in the refining step. The length of refining time required for a particular glass composition to reach a particular transformation temperture cannot be specified, as it depends upon the size of the batch, the type of furnace and crucible used, the exact temperature of the furnace, the furnace atmosphere and other variables. In general, the refining time may vary from 1 hour to one week, depending upon the desired transformation temperature and the variables listed above. However, if a given glass composition is refined until it reaches a given transformation temperature, which may be determined simply by differential thermal analysis of a cooled sample of the glass, properties such as water resistance will be reproducible from one batch of that composition to another. In general, the water resistance of a given glass composition increases with its transformaton temperature.

The Group VIb metal compounds usually will be added to the compositon in their highest oxidation state, corresponding to the trioxides. However, if reducing agents are present, for example ammonia if ammonium phosphates are used as sources of $P_2O_5$, some degree of reduction to lower oxidaton states may occur. Changes in the oxidation state of the Group VIb metal oxides do not greatly affect the transformation temperature or water resistance of the glass, but the colour may be greatly changed. Thus tungsten-containing glasses are pale straw coloured when the metal is fully oxidised to the hexavalent state, corresponding to $WO_3$, but deep blue if reduction to lower valency states has occurred to any significant extent.

If it is desired to prevent such reduction, the presence of a reducing agent should be avoided, for example by supplying the $P_2O_5$ as phosphoric acid rather than ammonium phosphate. In addition, it may be desirable to add an oxidising agent, for example if Na$_2$O is to be a consituent of the glass sodium nitrate may be added as a precursor of all or part of the Na$_2$O. At the temperatures at which the glasses are refined, sodium nitrate evolves oxidising gases including oxygen and oxides of nitrogen, which will oxidise any reduced tungsten oxides to WO$_3$. The oxidising agent, for example sodium nitrate, may be added to the batch at the premelt stage or at the refining stage.

If a colourless tungsten-containing glass is desired, for example for optical purposes, the pale yellow colour of the oxidised tungsten-contaning glass may be removed by adding trace amounts of metal oxides which give rise to an appropriate intensity of complementary colour, which in this case is green. Suitable metal oxides for this purpose include for exaple CuO, V$_2$O$_5$, UO$_3$ and CrO$_3$. The resulting glass will have slightly reduced light transmission, but no colour.

An advantage of the glass compositions of the present invention is their resistance to attack by water. The rate at which the glasses are dissolved by water may be expressed as the rate of loss of weight of a standard sample in units of %/min at a given water temperature.

The rate of solution at the boiling point of water is determined by the following procedure: Approximately 2g of molten glass is poured on to a steel plate and allowed to cool. The resulting smooth disc of glass, approximately 2cm in diameter and 0.3cm thick, is weighed, immersed in boiling water for 1 hour, dried and reweighed. The weight loss divided by the initial weight and multiplied by 100/60 gives the percentage weight loss/minute.

The transformation temperature of the glass is determined by differential calorimetry using the Du Pont Differential Thermal Analyser. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

The glasses of the invention may be suitable for co-processing with organic polymers in composites as described in our U.S. Pat. No. 3,732,181 and with inorganic components as described in our copending application Ser. No. 294,780. They may also be co-processed with pigments, opacifiers and the like.

Glasses according to the present invention preferably have transformation temperatures below 300°C, and may have transformation temperatures below 200°C. Preferably the rate of solution of the glasses in water at 100°C is less than 1.3%/min.

The preparaton of glasses according to the inventon is described in Exaples 1–12. Example 13 illustrates for the purpose of comparison a glass having no transition metal oxide, and Examples 14–16 illustrate glasses in which additional metal oxides other than Group VIb metal oxides are present.

EXAMPLE 1

3.0 Kg of tungsten-containing glass was prepared in two stages: (a) a premelt was prepared having a nominal composition P$_2$O$_5$, 70; WO$_3$, 5; Na$_2$O, 10; Li$_2$O, 10; PbO, 5 moles percent by stirring together 805g of ammonium dihydrogen orthophosphate, 779 g. of 88% orthophosphoric acid, 116g. tungstic oxide, 106g. sodium carbonate, 74.1g lithium carbonate, and 112g. litharge. This mixture was stirred at room temperature until carbon dioxide evolution was complete and it was then heated and stirred for 3 hours at 300°/350°C. The resulting mixture was then cooled to a solid premelt which was broken into pieces.

b. Two premelts were prepared and the pieces were placed in a crucible heated to 700°C to be refined. To assist in the refining process, a controlled stream of air was passed through the furnace. The refining process was carried on until the glass had the desired transformation temperature. It was then poured into a shallow stainless steel tray and allowed to solidify to a dark blue glass of density approximately 2.7 g/cc. The transformation temperature and rate of solution in water at 100°C were determined.

| Refining Time | Transformation Temperature | Rate of solution at 100°C |
|---|---|---|
| 1 hr | 130°C | 0.2%/min |
| 6 hr | 202°C | 0.007%/min |

EXAMPLE 2

| Mole % | Batch Wts. |
|---|---|
| 70 P$_2$O$_5$ | 1558 g 88% H$_3$PO$_4$ |
| 5 WO$_3$ | 116 g WO$_3$ |
| 10 Na$_2$O | 80.4 g Na$_2$CO$_3$ + 41.1 g NaNO$_3$ |
| 10 Li$_2$O | 74.1 g Li$_2$CO$_3$ |
| 5 PbO | 112 g PbO |

Stirred together and heated at 300°/350°C for 3 hours, followed by refining at 700°C produced a glass with properties similar to the glass of Example 1, but having a pale straw colour.

EXAMPLE 3

| Mole % | Batch wts. |
|---|---|
| 59.0 P$_2$O$_5$ | 1248 g 88% H$_3$PO$_4$ |
| 3.7 WO$_3$ | 92.8 g WO$_3$ |
| 14.0 Na$_2$O | 106 g Na$_2$CO$_3$ + 85 g NaNO$_3$ |
| 9.3 Li$_2$O | 66 g Li$_2$CO$_3$ |
| 14.0 PbO | 335 g PbO |

Stirred together at 300°/350°C for 3 hours, followed by refining at 700°C produced a pale straw coloured glass.

EXAMPLE 4

| Mole % | Batch wts |
|---|---|
| 71.8 P$_2$O$_5$ | 805 g NH$_4$H$_2$PO$_4$ + 779 g 88% H$_3$PO$_4$ |
| 2.6 WO$_3$ | 58 g WO$_3$ |
| 10.3 Na$_2$O | 106 g Na$_2$CO$_3$ |
| 10.3 Li$_2$O | 74.1 g Li$_2$CO$_3$ |
| 5.1 BaO | 76.5 g BaO |

Stirred together and heated at 300°/350°C for 3 hours, followed by refining at 700°C produced a deep blue glass.

| Refining Time | Transformation Temperature | Rate of Solution at 100°C |
|---|---|---|
| 4 hr | 178°C | 0.17%/min |
| 6 hr | 203°C | 0.013%/min |
| | density approx. 2.5g/cc | |

EXAMPLE 5

| Mole % | Batch Wts. |
|---|---|
| 71.8 $P_2O_5$ | 1558 g 88% $H_3PO_4$ |
| 2.6 $WO_3$ | 58 g $WO_3$ |
| 10.3 $Na_2O$ | 80 g $Na_2CO_3$ + 41.7 g $NaNO_3$ |
| 10.3 $Li_2O$ | 74.1 g $Li_2CO_3$ |
| 5.1 BaO | 76.5 g BaO |

Stirred together and heated at 300°/350°C for 3 hours, followed by refining at 700°C produced a pale straw coloured glass.

| Refining Time | Transformation Temperature | Rate of Solution at 100°C |
|---|---|---|
| 1 hr | 136°C | 1.3%/min |
| 4 hr | 162°C | 0.3%/min |
| 6 hr | 192°C | 0.036%/min |

EXAMPLE 6

| Mole % | Batch Wts. |
|---|---|
| 54 $P_2O_5$ | 1059 g 88% $H_3PO_4$ |
| 4 $WO_3$ | 132 g $Na_2WO_4.2H_2O$ |
| 14 $Na_2O$ | 55.4 g $Na_2CO_3$ + 82.2 g $NaNO_3$ |
| 8 $Li_2O$ | 39.3 g $Li_2CO_3$ |
| 20 PbO | 446 g PbO |

Stirred together and heated at 300°/350°C for 3 hours followed by refining at 700°C. A pale straw coloured glass was produced.

| Refining Time | Transformation Temperature | Rate of Solution at 100°C |
|---|---|---|
| 8 hr | 218°C | 0.025%/min |

EXAMPLE 7

| Mole % | Batch Wts. |
|---|---|
| 52 $P_2O_5$ | 1019 g 88% $H_3PO_4$ |
| 2 $B_2O_3$ | 38.2 g $Na_2B_4O_7.10H_2O$ |
| 4 $WO_3$ | 132 g $Na_2WO_4.2H_2O$ |
| 14 $Na_2O$ | 49.9 g $NaNO_3$ + 65.3 g $Na_2CO_3$ |
| 8 $Li_2O$ | 59.3 g $Li_2CO_3$ |
| 20 PbO | 446 g PbO |

Heated at 200°/360°C for 4 hours then refined at 700°C. A straw coloured glass was produced.

| Refining Time | Transformation TemperatuRe | Rate of Solution at 100°C |
|---|---|---|
| 1.5 hr | 154°C | 0.88%/min |

-continued

| Refining Time | Transformation TemperatuRe | Rate of Solution at 100°C |
|---|---|---|
| 16 hr | 269°C | 0.011%/min |

EXAMPLE 8

| Mole % | Batch Wts. |
|---|---|
| 71.8 $P_2O_5$ | 805 g $NH_4H_2PO_4$ + 779 g 88% $H_3PO_4$ |
| 2.6 $MoO_3$ | 44.2 g $(NH_4)_6Mo_7O_{24}.4H_2O$ |
| 10.3 $Li_2O$ | 74.1 g $Li_2CO_3$ |
| 10.3 $Na_2O$ | 106 g $Na_2CO_3$ |
| 5.1 BaO | 76.5 g BaO |

Heated at 350°C for 3½ hours followed by refining at 700°C. Produced an olive green glass.

| Refining Time | Transformation Temperature | Rate of Solution at 100°C |
|---|---|---|
| 2 hr | 150°C | 0.04%/min |
| 4 hr | 171°C | 0.0086%/min |

EXAMPLE 9

| Mole % | Batch Wts. |
|---|---|
| 70 $P_2O_5$ | 1558 g 88% $H_3PO_4$ |
| 5 $WO_3$ | 116 g $WO_3$ |
| 10 $Na_2O$ | 80.4 g $Na_2CO_3$ + 41.1 g $Na_2NO_3$ |
| 10 $Li_2O$ | 74.1 g $Li_2CO_3$ |
| 5 BaO | 76.5 g BaO |

Heated at 300°/350°C for 3 hours and then refined at 700°C produced a pale straw coloured glass.

| Refining Time | Transformation Temperature | Rate of Solution at 100°C |
|---|---|---|
| 1 hr | 126°C | 1.58%/min |
| 4 hr | 194°C | 0.011%/min |

EXAMPLE 10

| Mole % | Batch Wts. |
|---|---|
| 71.8 $P_2O_5$ | 805 g $NH_4H_2PO_4$ + 779 g 88% $H_3PO_4$ |
| 2.6 $CrO_3$ | 25 g $CrO_3$ |
| 10.3 $Na_2O$ | 106 g $Na_2CO_3$ |
| 10.3 $Li_2O$ | 74.1 g $Li_2CO_3$ |
| 5.1 BaO | 76.5 g BaO |

Heated at 350°C for 3 hours then refined at 700°C. Produced an emerald green glass.

| Refining Time | Transformation Temperature | Rate of Solution at 100°C |
|---|---|---|
| 2 hr | 140°C | 0.14%/min |

EXAMPLE 11

| Mole % | Batch Wts. |
|---|---|
| 71 $P_2O_5$ | 1558 g 88% $H_3PO_4$ |
| 2 $MoO_3$ | 35.4 g $(NH_4)_6Mo_7O_{24}.4H_2O$ |
| 2 $CrO_3$ | 20 g $CrO_3$ |
| 10 $Na_2O$ | 80.4 g $Na_2CO_3$ + 41.1 g $NaNO_3$ |
| 10 $Li_2O$ | 74.1 g $Li_2CO_3$ |
| 5 BaO | 76.5 g BaO |

The premelt was heated at 325°/360°C for 2½ hours then refined at 700°C, producing a green glass.

EXAMPLE 12

| Mole % | Batch Wts. |
|---|---|
| 68.0 $P_2O_5$ | 1558 g 88% $H_3PO_4$ |
| 1.9 $CrO_3$ | 20 g $CrO_3$ |
| 1.9 $MoO_3$ | 35.4 g $(NH_4)_6Mo_7O_{24}.4H_2O$ |
| 3.9 $WO_3$ | 92.8 g $WO_3$ |
| 9.7 $Na_2O$ | 80.4 g $Na_2CO_3$ + 41.1 g $NaNO_3$ |
| 9.7 $Li_2O$ | 74.1 g $Li_2CO_3$ |
| 4.9 BaO | 76.5 g BaO |

The premelt was heated at 350°C for 2½ hours then refined at 700°C, producing a dark green glass.

EXAMPLE 13

The glass according to this Example is a composition corresponding closely to those of Examples 4, 5, 8, 9 and 10, but containing no Group VIa metal oxide, and is included here for the purpose of comparison with these Examples.

| Mole % | Batch Wts. | | |
|---|---|---|---|
| 75 $P_2O_5$ | 865 g $NH_4H_2PO_4$ + 830 g 88% $H_3PO_4$ | | |
| 10 $Na_2O$ | 106 g $Na_2CO_3$ | | |
| 10 $Li_2O$ | 741 g $Li_2CO_3$ | | |
| 5 BaO | 76.5 g BaO | | |
| Refining Time | Transformation Temperature | Rate of Solution at 100°C | |
| 1 hr | 117°C | 2.5%/min | |
| 6 hr | 192°C | 0.20%/min | |

EXAMPLES 14–16

These Examples illustrate the addition of metal oxides other than Group VIa oxides to a base glass composition closely similar to that of Example 13. In Examples 14 & 15 the added metal oxides are transition metal oxides of groups other than Group VI; in Example 16, the added metal oxide is the oxide of a main group metal of Group VIb. It will be seen that the resulting glasses have water solubilities even greater than that of the glass of Example 13.

Glass composition (mole percent) 72 $P_2O_5$, 10.2 $Li_2O$, 10.2 $Na_2O$, 5.1 BaO, 2.5 additional metal oxide.

| Example | Additional metal oxide | colour | Refining Time (hr) | Transformation Temp (°C) | Rate of Solution at 100°C (%/min) |
|---|---|---|---|---|---|
| 14 | $MnO_2$ | colourless | 1; 4 | 106; 181 | 20; 0.28 |
| 15 | CuO | pale green | 2; 4 | 139; 164 | 1.9; 0.43 |
| 16 | $TeO_2$ | purple | 1, 4 | 114; 161 | 11; 1.5 |

What we claim is:

1. Inorganic oxide glasses having compositions consisting essentially of ingredients within the range (in mole percent):
   a. $P_2O_5$, 50–75%;
   b. Group VIb oxides 0.1–10%, comprising singly or in combination $CrO_3$ up to 2.6%, $MoO_3$ up to 7%, $WO_3$ up to 7%;
   c. at least one oxide selected from the group consisting of alkali metal oxides, alkaline earth oxides 15–49.9%; and
   d. lead oxide,
the total of all the above ingredients being at least 98 moles percent of the total composition with no more than 2% of other oxides, excluding water.

2. Inorganic oxide glasses as claimed in claim 1 in which the content of $MoO_3$ is up to 2.6 moles %.

3. Inorganic oxide glasses as claimed in claim 1 in which the total content of Group VIb oxides is 0.1–8 moles %.

4. Inorgaic oxide glasses as claimed in claim 3 in which the total content of Group VIb oxides is 0.1–5 moles %.

5. Inorganic oxide glasses as claimed in claim 1 in which the Group VIb oxide component is $CrO_3$.

6. Inorganic oxide glasses as claimed in claim 5 in which the content of $CrO_3$ is 2.0–2.6 moles %.

7. Inorganic oxide glasses as claimed in claim 1 in which the Group VIb oxide component is $MoO_3$.

8. Inorganic oxide glasses as claimed in claim 7 in which the content of $MoO_3$ is 2.0–5 moles %.

9. Inorganic oxide glasses as claimed in claim 8 in which the content of $MoO_3$ is 2.0–2.6 moles %.

10. Inorganic oxide glasses as claimed in claim 1 in which the Group VIb oxide component is $WO_3$.

11. Inorganic oxide glasses as claimed in claim 10 in which the content of $WO_3$ is 2.0–5 moles %.

12. Inorgaic oxide glasses as claimed in claim 1 having a transformation temperature not greater than 300°C.

13. Inorganic oxide glasses as claimed in claim 1 having a rate of solution in water at 100°C. not greater than 1.3%/min.

14. Inorganic glasses as claimed in claim 12 having a transformation temperature not greater than 300°C. and a rate of solution in water at 100°C. not greater than 1.3%/min.

15. A method of preparing an inorganic oxide glass comprising the steps of taking inorganic oxides or their precursors in molar proportions according to claim 25 and heating them together at a temperature of at least 500°C. and not exceeding 800°C. until the desired transformation temperature is reached.

16. A method as claimed in claim 15 in which one of the inorganic oxides or their precursors other than a Group VIb oxide or its precursors is an oxidizing agent capable of oxidizing a low-valency Group VIb oxide to its hexavalent oxidation state.

17. A method as claimed in claim 16 in which the oxidizing agent is sodium nitrate.

18. A method as claimed in claim 16 in which the glass contains tungsten oxide as the sole Group VIb oxide.

* * * * *